2,852,430

CHLORAMPHENICOL ESTER COMPOSITIONS

Max T. Goebel, Landenberg, Pa., assignor to E. I. du Pont de Nemours and Company, Wilmington, Del., a corporation of Delaware No Drawing. Application July 8, 1954
Serial No. 442,185

9 Claims. (Cl. 167—65)

This invention relates to water-soluble, therapeutically active, powdery compositions containing salts of half-esters of dibasic acids with nitrophenylamidopropanediols. The invention is further directed to methods for the prophylaxis and curative treatment of warm blooded animals which are exposed to infectious diseases. The present invention is also directed to flock and herd treatment of infectious diseases of poultry and livestock by administration to the animal of a water-soluble derivative of a nitrophenylamidopropanediol via the animal's drinking water.

The water-soluble compositions of my invention comprise a salt of the following formula (1) 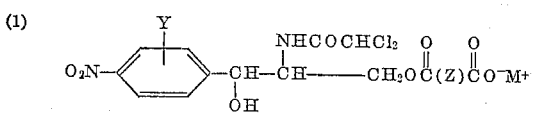

where Y is a member of the class consisting of hydrogen, halogen, lower alkyl and lower alkoxy; Z is a divalent organic radical having from 2 to 10 carbon atoms; and M is a member of the group consisting of ammonium, sodium, potassium, magnesium and calcium.

Salts of Formula 1 in which Z is a saturated or unsaturated divalent aliphatic radical having from two to ten carbon atoms are a preferred group of products of this invention. Also preferred are the compositions containing salts of Formula 1 in which Z is phenyl. Especially preferred are sodium, potassium, and calcium salts of Formula 1 in which Z is a saturated or unsaturated divalent aliphatic radical having from 2 to 5 carbon atoms, and in which Y is hydrogen.

The compositions of the invention can be made by several methods. One method which is very satisfactory consists in mixing a compound of the formula (2) 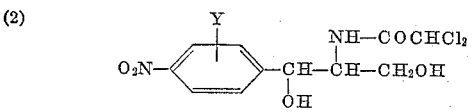

where Y has the same significance as in Formula 1, with an anhydride of dibasic acid in a liquid medium. Any tertiary organic base such as for instance trimethylamine, triethylamine, N-methylmorpholine, N-ethylmorpholine, N-methylpiperidine, or quinoline, can be employed as the medium. An especially preferred medium is anhydrous pyridine.

For the preparation of esters of amidopropanediols from the cyclic anhydrides, the Schotten-Baumann method may be employed. For instance, an aqueous NaOH solution containing dimethylformamide may be used to advantage as a medium in which a compound of Formula 2 is reacted with the dibasic acid.

For the preparation of higher dibasic acid esters, that is, esters of dibasic acid which do not readily form cyclic anhydrides, it is preferred to employ a mixture of free dibasic acid and dibasic acid chloride equilibrated in the reaction medium. This mixture is then reacted with the diol of Formula 2.

The nitrophenyl - 2 - (alpha,alpha-dichloroacetamido)-1,3-propanediols of Formula 2 are known compounds. Their preparation is fully described and claimed in United States Patent 2,483,884.

It will be understood that all of the propanediols of Formula 2 may exist in several optical isomeric forms. This invention is concerned primarily with compositions containing the therapeutically active threo enantiomorphs and their racemates. Where no notation appears with a structural formula or with a chemical name the formula or name is to be interpreted in its generic sense. In other words, a formula or name represents not only the unresolved mixture of isomers but also the individual isomers and racemates.

The desired dibasic half ester of the therapeutically active propanediol is isolated from the reaction mixture by diluting the mixture with water and acidifying. The ester usually precipitates from the mixture upon acidification. If not, it can be obtained by conventional extraction procedures. A preferred practice is to concentrate the reaction mixture prior to dilution.

The ammonium or metal salt of the ester is readily prepared by mixing acid ester with an equivalent amount of ammonium or metal hydroxide, carbonate or bicarbonate. In addition to the ammonium salt, preferred salts include those of alkali-metals having atomic numbers of from 3 to 19, and those of the alkaline earth metals. Especially preferred is the sodium salt.

As already indicated, a salt of Formula 1 is the predominant and primary active chemotherapeutic agent in the compositions of the invention. It will be understood, however, that in addition to the salt represented by Formula 1 the compositions can contain a solid, water-soluble, substantially non-toxic medicinal carrier such as, for instance, lactose, sugar, maltose, glucose, sucrose, and the like. Compositions containing such a carrier are particularly useful for administration to warm-blooded animals via their drinking water, for the carrier is beneficial in getting the animal to drink more water and it simplifies the preparation of an elixir. Furthermore, compositions suitable for preparing aqueous solutions may be prepared by combining the dry powdery acid ester and an equivalent quantity of a dry base such as potassium bicarbonate, sodium bicarbonate, calcium carbonate and calcium hydroxide, and, if desired, with a water-soluble carrier.

Clear neutral solutions of the compositions of this invention can be readily prepared. Such solutions are exceptionally well-suited for administration by various means to warm-blooded animals for the control of infactious diseases caused by either gram-negative or gram-positive organisms.

The water-soluble compositions of my invention can be dissolved in the drinking water of warm-blooded animals. Known amounts of powder, say, from ½% or less up to 10%, dissolved in a given volume of water can be given ad libitum to the animals to be treated. This mode of flock and herd treatment of infectious diseases of poultry and livestock is of special value both because of the ease of administration and from the fact that sick animals, though off feed, still consume drinking water. Thus, a chemotherapeutic agent provided in the feed is of no value to sick animals which are off feed, while that supplied in the drinking water is of benefit.

For intravenous administration, the clear neutral non-toxic water soluble solutions readily prepared by dissolving the compositions in water offer many advantages in the treatment of acute infectious processes. Aqueous solutions containing from 20 to 40% of a salt of Formula 1 are highly useful for this purpose but the concentration of the chemotherapeutic agent may vary over a wide range, preferably not less than about 5 or 10%. The compositions can be supplied as a stable, dry sterile powder which is easily and completely dissolved aseptically in sterile saline for injection. Or the compositions can be supplied as a dry powder consisting of the acid ester and an equivalent quantity of sodium bicarbonate or calcium hydroxide.

The compositions of the invention may also be administrated as a drench containing from about 5 to about 60% of the active ingredient.

In order to better understand my invention, reference should be had to the following illustrative examples:

EXAMPLE 1

*Preparation of succinic acid ester (acid) of D-(-)-threo-1 - (p - nitrophenyl) - 2 - (alpha,alpha - dichloroacetamido)-1,3-propanediol and metal salts*

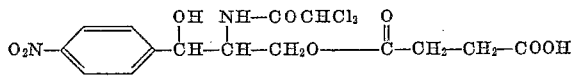

A mixture of 30.9 g. of D-(-)-threo-1-(p-nitrophenyl)-2 - (alpha,alpha - dichloroacetamido) - 1,3 - propanediol (Chloramphenicol) and 10 g. of succinic anhydride in 150 cc. of anhydrous pyridine is warmed to 80° C. for two hours. The excess pyridine is distilled off under reduced pressure, and the residue taken up in water and made acid with dilute hydrochloric acid. The product separates from the solution on cooling and crystallizes on standing. It may be further purified by dissolving in aqueous sodium bicarbonate and reprecipitating with acid. It may be purified further by recrystallizing from ethylene dichloride.

Metal salts of this acid are prepared by mixing the acid with an equivalent quantity of the appropriate metal hydroxide, carbonate or bicarbonate in an aqueous medium. The ammonium salt may be prepared by adding an equivalent of aqueous ammonia to a suspension of the acid in water. The salts may be isolated in dry form by concentrating under reduced pressure or lyophilized.

EXAMPLE 2

*Preparation of the phthalic acid ester (acid) of (dl)-threo - 1 - (p - nitrophenyl) - 2 - (alpha,alpha - dichloroacetamido)-1,3-propanediol and metal salts thereof*

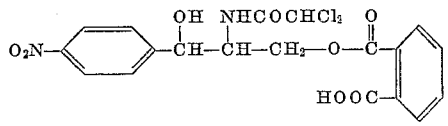

A solution of 15.5 g. of racemic chloramphenicol and 7.4 g. of phthalic anhydride in 100 cc. of anhydrous pyridine is warmed to 80° C. for three hours. The excess pyridine is then removed by distillation under reduced pyridine until the residue becomes viscous. Water is added and the mixture made acid with hydrochloric acid. A gum separates which is dissolved in aqueous sodium bicarbonate. The solution is extracted several times with ethyl acetate and the aqueous layer is then aerated with nitrogen to remove the ethyl acetate. The aqueous layer is made acid with hydrochloric acid and the product separates as a gum which slowly crystallizes. It may be recrystallized from acetonitrile.

Metal salts of this acid can be prepared by suspending the acid in water and adding an equivalent of the appropriate base. The base can be a metal hydroxide, metal oxide, metal bicarbonate, a metal carbonate or ammonium hydroxide.

The examples have illustrated the products of this invention with certain specific compounds. However, the invention is generic to all the compounds within the scope of Formula 1.

The Z of Formula 1 is a divalent aliphatic or aromatic group of 2–10 carbon atoms. It can be saturated or unsaturated, branched or straight-chained. It may be substituted with ester and ether groups provided of course the total number of carbon atoms does not exceed 10.

Specific examples of salts of the invention other than those already described include:

Sodium salt of succinic acid half ester of 1-(p-nitrophenyl) - 2 - (alpha,alpha - dichloroacetamido) - 1,3-propanediol Potassium salt of acetoxysuccinic acid half ester of 1-(p-nitrophenyl) - 2 - (alpha,alpha - dichloroacetamido)- 1,3-propanediol Ammonium salt of maleic acid half ester of 1-(p-nitrophenyl)-2 - (alpha,alpha - dichloroacetamido) - 1,3-propanediol Magnesium salt of fumaric acid half ester of 1-(p-nitrophenyl)-2 - (alpha,alpha - dichloroacetamido) - 1,3-propanediol Calcium salt of glutaric acid half ester of 1 - (p - nitrophenyl) - 2 - (alpha,alpha - dichloroacetamido) - 1,3-propanediol Sodium salt of citraconic acid half ester of 1-(p-nitrophenyl) - 2 - (alpha,alpha - dichloroacetamido) - 1,3-propanediol Ammonium salt of measaconic acid half ester of 1-(p-nitrophenyl) - 2 - (alpha,alpha - dichloroacetamido)- 1,3-propanediol Sodium salt of itaconic acid half ester of 1 - (p - nitrophenyl) - 2 - (alpha,alpha - dichloroacetamido) - 1,3-propanediol Sodium salt of camphoric acid half ester of 1 - (p - nitrophenyl) - 2 - (alpha,alpha - dichloroacetamido) - 1,3-propanediol Sodium salt of phthalic acid half ester of 1 - (p - nitrophenyl) - 2 - (alpha,alpha - dichloroacetamido) - 1,3-propanediol Sodium salt of isophthalic acid half ester of 1 - (p - nitrophenyl) - 2 - (alpha, alpha - dichloroacetamido) - 1,3-propanediol Ammonium salt of terphthalic acid half ester of 1 - (p-nitrophenyl) - 2 - (alpha,alpha - dichloroacetamido)- 1,3-propanediol Potassium salt of naphthalic acid half ester of 1 - (p-nitrophenyl) - 2 - (alpha,alpha - dichloroacetamido)- 1,3-propanediol Compositions containing sodium salt of the succinic acid half ester of (dl)-threo-1-(p-nitrophenyl) - 2-(alpha, alpha - dichloroacetamido) - 1,3 - propanediol are especially useful. Such a composition administered in the drinking water provides warm-blooded animals both prophylactic and curative action on Salmonella, Vibrio, Rickettsial and pleuropneumonia infections. Infections caused by such organisms as *Diplococcus pneumoniae*, *Klebsiella pneumoniae*, and *Salmonella typhimurium* can be controlled.

I claim:

1. A composition for controlling infectious diseases caused by gram-negative and gram-positive organisms comprising not less than 0.5 percent of a compound having the formula

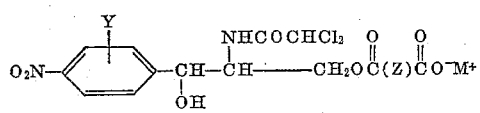

where Y is a member of the class consisting of hydrogen, halogen, lower alkyl and lower alkoxy; Z is a divalent organic radical having from 2 to 10 carbon atoms selected from the group consisting of alkylene, alkenylene, and arylene radicals, said divalent organic radical having as constituents of the linking chain only carbon and hydrogen, the substituents on said linking chain being selected from the group consisting of hydrogen, alkoxy and acyloxy radicals, and M is a member of the group consisting of ammonium, sodium, potassium, magnesium and calcium; and a significant amount of a solid, water-soluble medicinal carrier.

2. A composition according to claim 1 in which the carrier comprises at least one member selected from the group consisting of lactose, maltose, glucose and sucrose.

3. A composition for controlling infectious diseases caused by gram-negative and gram-positive organisms comprising not less than 0.5 percent of a compound having the formula

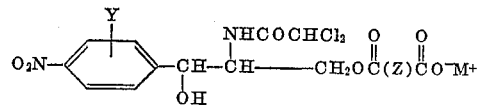

where Y is a member of the class consisting of hydrogen, halogen, lower alkyl and lower alkoxy; Z is a divalent organic radical having from 2 to 10 carbon atoms selected from the group consisting of alkylene, alkenylene, and arylene radicals, said divalent organic radical having as constituents of the linking chain only carbon and hydrogen, the substituents on said linking chain being selected from the group consisting of hydrogen, alkoxy and acyloxy radicals, and M is a member of the group consisting of ammonium, sodium, potassium, magnesium and calcium; and a sterile saline diluent.

4. A composition according to claim 3 especially suited for intravenous administration in which the concentration of the therapeutically active compound in the saline solution is from 20 to 40 percent.

5. A composition for controlling infectious diseases caused by gram-negative and gram-positive organisms comprising not less than 0.5 percent of a sodium salt of the succinic acid half ester of $(dl)$-threo-1-(p - nitrophenyl) - 2 - ($\alpha,\alpha$ - dichloroacetamido) - 1,3 - propanediol and a significant amount of a solid, water-soluble, medicinal carrier.

6. A composition for controlling infectious diseases caused by gram-negative and gram-positive organisms comprising not less than 0.5 percent of calcium salt of the glutaric acid half ester of 1-(p-nitrophenyl)-2-($\alpha,\alpha$-dichloroacetamido) - 1,3 - propanediol and a significant amount of a solid, water-soluble, medicinal carrier.

7. A composition for controlling infectious diseases caused by gram-negative and gram-positive organisms comprising not less than 0.5 percent of sodium salt of diacetoxysuccinic acid half ester of 1 - (p - nitrophenyl)-2 - ($\alpha,\alpha$ - dichloroacetamido) - 1,3 - propanediol and a significant amount of a solid, water-soluble, medicinal carrier.

8. A composition for controlling infectious diseases caused by gram-negative and gram-positive organisms comprising not less than 0.5 percent of a sodium salt of the succinic acid half-ester of $(dl)$ - threo - 1 - (p-nitrophenyl) - 2 - (alpha,alpha - dichloroacetamido)-1,3-propanediol; and a sterile saline diluent.

9. A composition according to claim 5 in which the carrier comprises at least one member selected from the group consisting of lactose, maltose, glucose and sucrose.

References Cited in the file of this patent

UNITED STATES PATENTS

| | | |
|---|---|---|
| 2,562,107 | Long | July 24, 1951 |
| 2,586,661 | Jacob et al. | Feb. 19, 1952 |
| 2,662,906 | Edgerton | Dec. 15, 1953 |